United States Patent
Horng et al.

(10) Patent No.: US 8,008,820 B2
(45) Date of Patent: Aug. 30, 2011

(54) INNER-ROTOR-TYPE MOTOR

(75) Inventors: Alex Horng, Kaohsiung (TW); Tso-Kuo Yin, Kaohsiung (TW); Chia-Chun Liu, Kaohsiung (TW)

(73) Assignee: Sononwealth Electric Machine Industry Co., Ltd., Kaohsiung (TW)

( * ) Notice: Subject to any disclaimer, the term of this patent is extended or adjusted under 35 U.S.C. 154(b) by 144 days.

(21) Appl. No.: 12/404,374

(22) Filed: Mar. 16, 2009

(65) Prior Publication Data
US 2010/0231073 A1      Sep. 16, 2010

(51) Int. Cl.
*H02K 5/16*      (2006.01)
(52) U.S. Cl. .......................................... 310/90; 384/477
(58) Field of Classification Search ............... 310/90, 310/89, 254.1, 261.1; 384/477, 484–486, 384/488, 489
See application file for complete search history.

(56) References Cited

U.S. PATENT DOCUMENTS

| | | | | |
|---|---|---|---|---|
| 3,720,852 | A | * | 3/1973 | Vieweg et al. .................. 310/90 |
| 4,633,149 | A | * | 12/1986 | Welterlin ................. 318/400.41 |
| 6,919,659 | B2 | | 7/2005 | Rapp |
| 2007/0273227 | A1 | | 11/2007 | Lan et al. |

\* cited by examiner

*Primary Examiner* — Quyen Leung
*Assistant Examiner* — Leda Pham
(74) *Attorney, Agent, or Firm* — Alan Kamrath; Kamrath & Associates PA

(57) ABSTRACT

An inner-rotor-type motor includes a housing, a stator, a rotor, a permanent magnet and a cover plate. The housing has a compartment. The stator is received in the compartment. There is an assembling hole arranged at the axial center of the stator and passing through the stator from the top to the bottom thereof. The rotor has a shaft with one end thereof rotatably extending through the assembling hole, with a bearing being mounted around the shaft. The permanent magnet is fixed to an outer periphery of the shaft and beside the bearing, with the permanent magnet facing the stator. The cover plate is arranged between the permanent magnet and the bearing. Consequently, impurities are prevented from entering an undesired interstice between the bearing and the shaft or from entering the inside of the bearing, such that smooth rotation of the rotor is provided and such that life of the inner-rotor-type motor is extended.

5 Claims, 5 Drawing Sheets

INNER-ROTOR-TYPE MOTOR

BACKGROUND OF THE INVENTION

1. Field of the Invention

The present invention relates to an inner-rotor-type motor and, more particularly, to an inner-rotor-type motor with cover plates.

2. Description of the Related Art

FIG. 1 shows a conventional inner-rotor-type motor 9 including a housing 91, a stator 92, a rotor 93 and a permanent magnet 94. The housing 91 has a compartment 910 receiving the stator 92. There is an assembling hole 921 arranged at the axial center of the stator 92, with the assembling hole 921 passing through the stator 92 from the top to the bottom thereof. The rotor 93 has a shaft 931 with an outer periphery where the permanent magnet 94 is fixed. The shaft 931 rotatably extends through the assembling hole 921. Two bearings 95 are mounted around the shaft 931, with the permanent magnet 94 being between the two bearings 95 and facing the stator 92.

In use, the stator 92 is controlled to proceed with energizing to react with the permanent magnet 94, and, then, the rotor 93 rotates. Furthermore, in order to prevent the permanent magnet 94 from hitting the stator 92 during rotation of the rotor 93 to avoid damage, there is a spacing between the permanent magnet 94 and the stator 92.

Generally, a motor is constructed by many components, which have complicated shapes and may be integrally formed by powder metallurgy, such as a core of the stator 92 and the permanent magnet 94. However, the rotor 93 is turning, and the motor 9 is vibrating during operation. This kind of situation will easily lead to generation of undesired powder parted from the components. The bearings 95 of the conventional inner-rotor-type motor 9 are often selected from ball bearings 951, and there are gaps formed between the shaft 931 and the bearings 95 and between an inner ring and an outer ring constructing the ball bearing 951. Because of gravity and vibration of the operating motor 9, the undesired powder may fall into the gaps to affect rotation of the shaft 931 in the bearings 95 and function of the ball bearing 951. Thus, non-smooth rotation of the rotor 93 as well as reduction of life of the motor 9 will result. Hence, there is a need for an improvement over the conventional inner-rotor-type motor 9.

SUMMARY OF THE INVENTION

It is therefore the primary objective of this invention to provide an inner-rotor-type motor that prevents impurities from entering an undesired interstice between a bearing and a shaft or entering the inside of the bearing to assure smooth operation and a prolonged life of the inner-rotor-type motor.

An inner-rotor-type motor according to the preferred teachings of the present invention includes a housing, a stator, a rotor, a permanent magnet and a cover plate. The housing has a compartment. The stator is received in the compartment. There is an assembling hole arranged at the axial center of the stator and passing through the stator from the top to the bottom of the stator. The rotor has a shaft with one end thereof rotatably extending through the assembling hole, with a bearing being mounted around the shaft. The permanent magnet is fixed to an outer periphery of the shaft and beside the bearing, with the permanent magnet facing the stator. The cover plate is arranged between the permanent magnet and the bearing.

By arranging the cover plate between the permanent magnet and the bearing, impurities like undesired powder parted from the permanent magnet or other components are prevented from entering an undesired interstice between the bearing and the shaft or entering the inside of the bearing. Accordingly, influence of impurities on rotation of the shaft is avoided to provide smooth rotation and to extend life of the inner-rotor-type motor.

Further scope of the applicability of the present invention will become apparent from the detailed description given hereinafter. However, it should be understood that the detailed description and specific examples, while indicating preferable embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and, thus, are not limitative of the present invention, and wherein.

Figure 1:
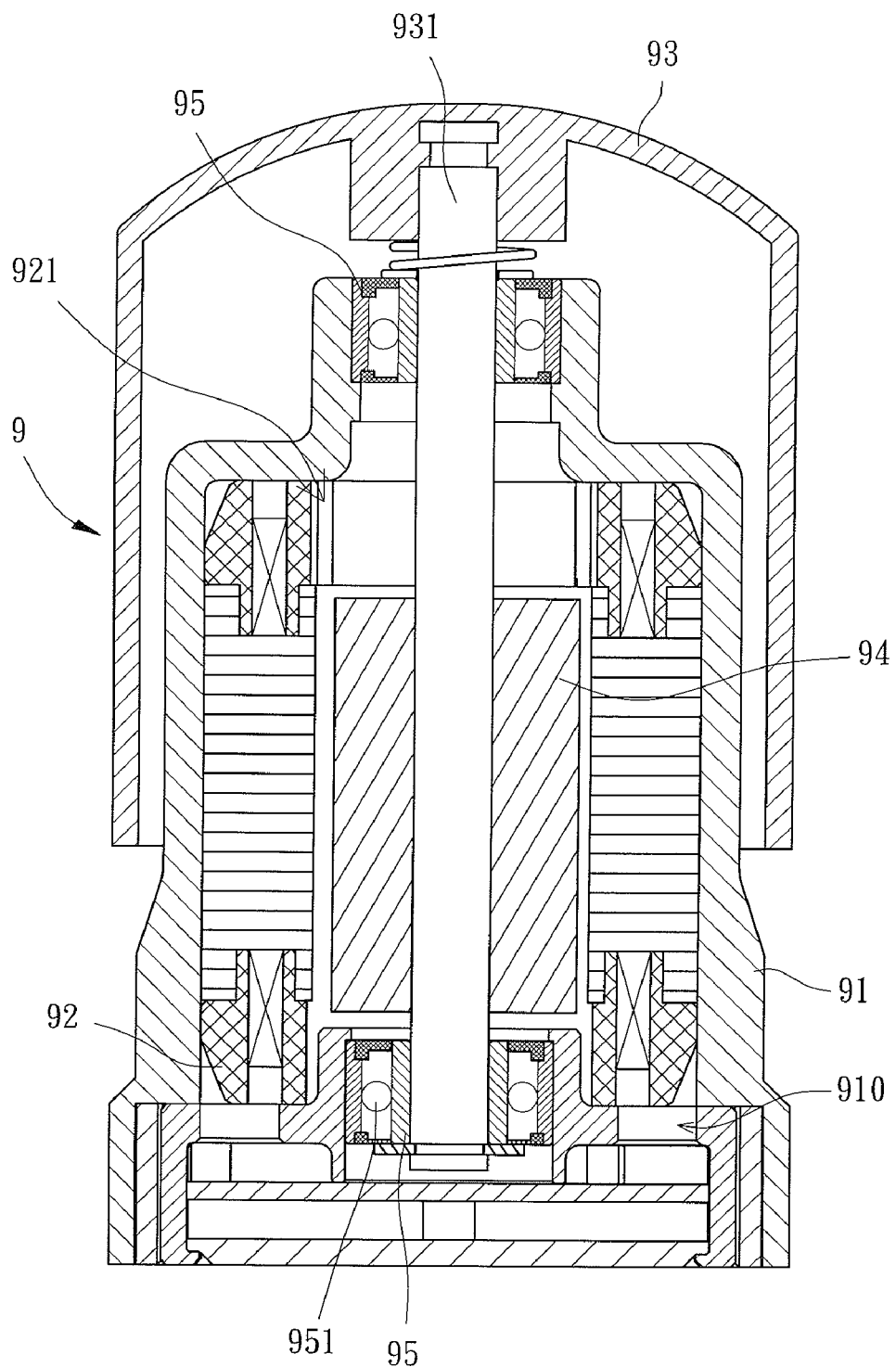
FIG. 1 is a cross sectional view illustrating a conventional inner-rotor-type motor.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "inner", "outer", "lower", "end", "portion", "top", "bottom", "axial", "spacing", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
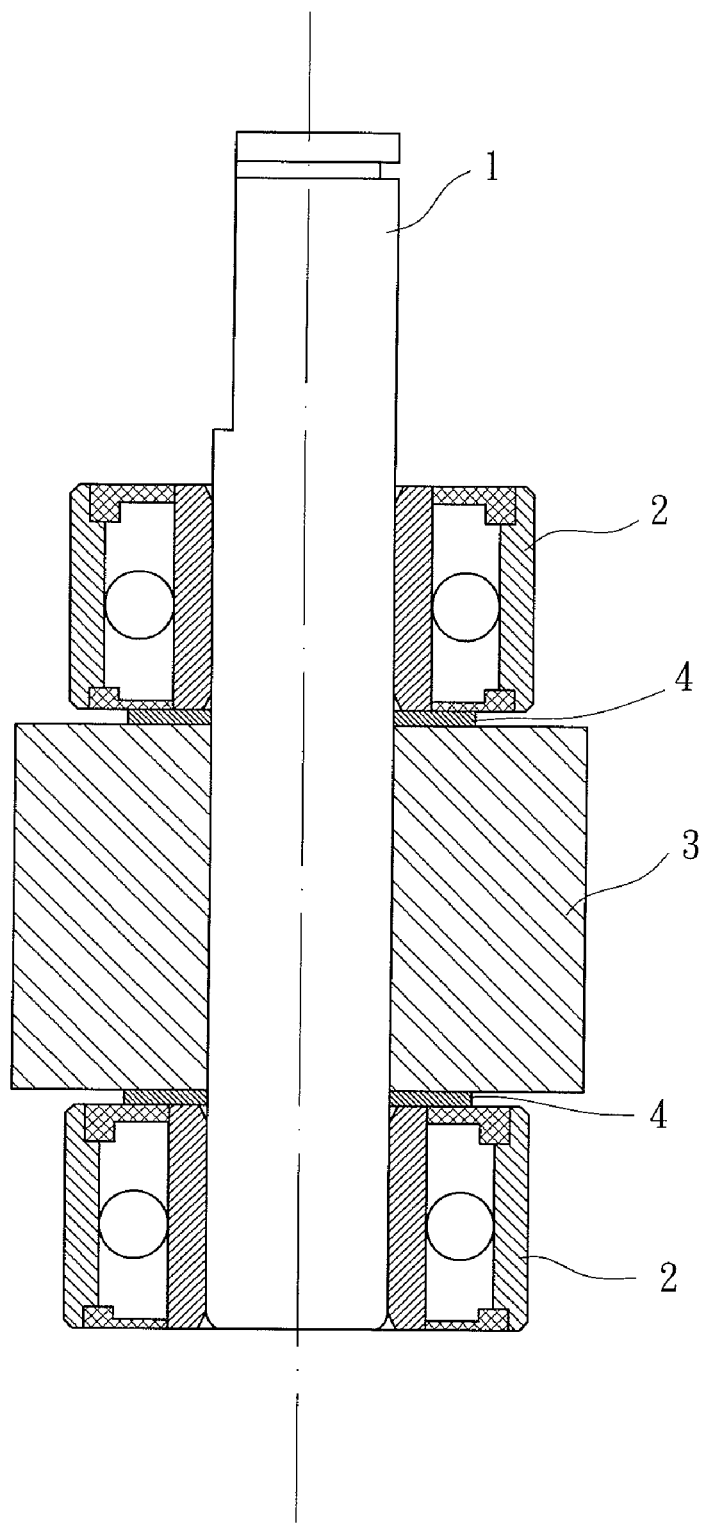
FIG. 2 is a cross sectional view illustrating a coupling structure for a rotor of an inner-rotor-type motor according to the preferred teachings of the present invention.

FIG. 2 of the drawings shows a coupling structure for a rotor according to the preferred teachings of the present invention. For a shaft 1 of the rotor to be mounted inside an inner-rotor-type motor, two bearings 2 are mounted around the shaft 1. There is a permanent magnet 3 fixed to an outer periphery of the shaft 1 and between the two bearings 2.

The coupling structure for a rotor is characterized in that there are two cover plates 4 arranged between the permanent magnet 3 and the bearings 2 to prevent impurities such as undesired powder parted from components of the inner-rotor-type motor from falling into and depositing in gaps between the shaft 1 and the bearings 2 or from falling into and depositing in the insides of the bearings 2. Hence, smooth rotation of the shaft 1 in the bearings 2 is not affected.

On the base of and with the idea disclosed by the coupling structure for a rotor mentioned above, an inner-rotor-type motor 5 with an anti-impurity design that is a preferred embodiment according to the preferred teachings of the present invention is further described in the following.

Figure 3:
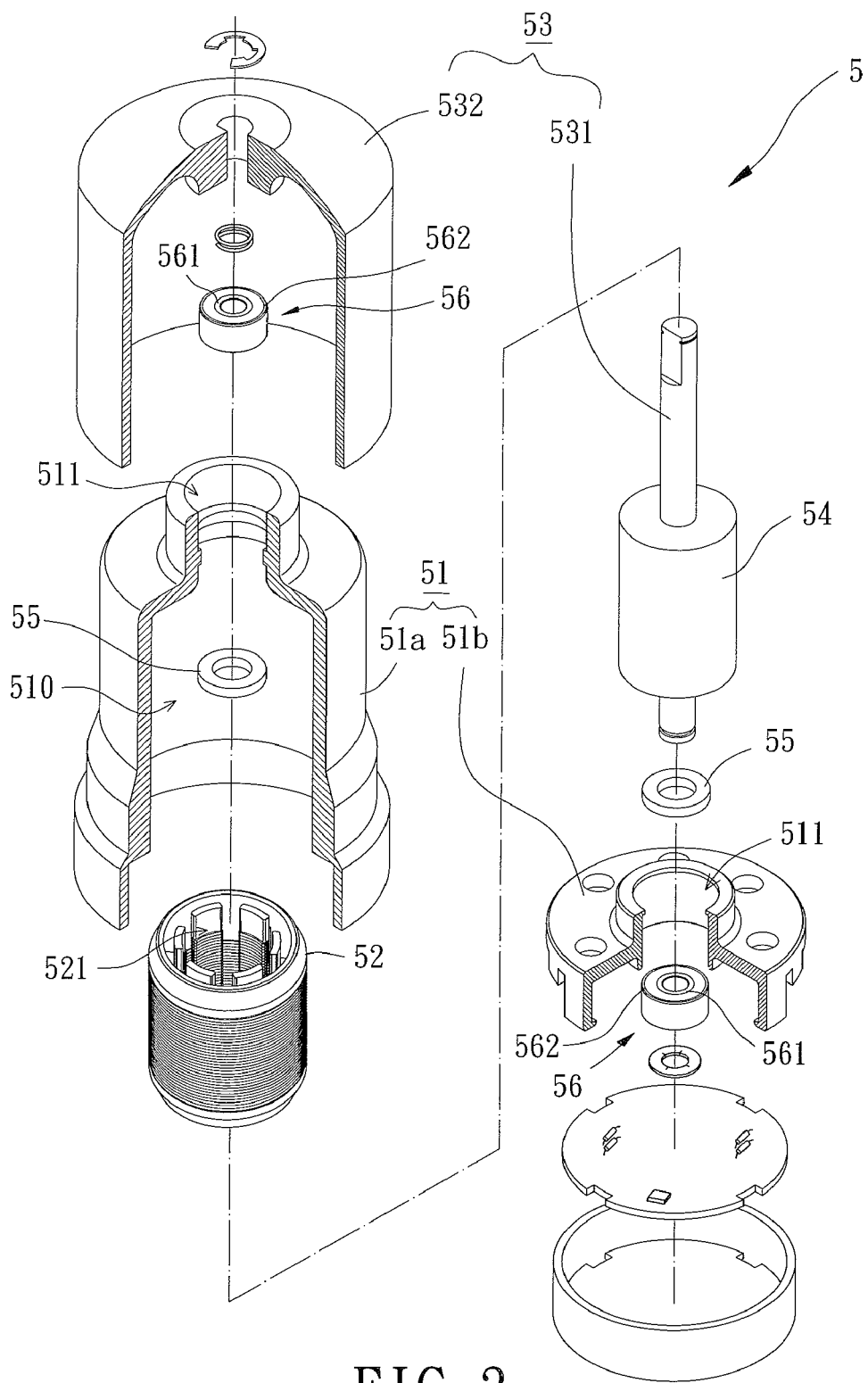
FIG. 3 is an exploded perspective view illustrating an inner-rotor-type motor in accordance with a preferred embodiment of the present invention.

Referring to FIG. 3 of the drawings, the inner-rotor-type motor 5 includes a housing 51, a stator 52, a rotor 53, a permanent magnet 54, and two cover plates 55.

Figure 4:
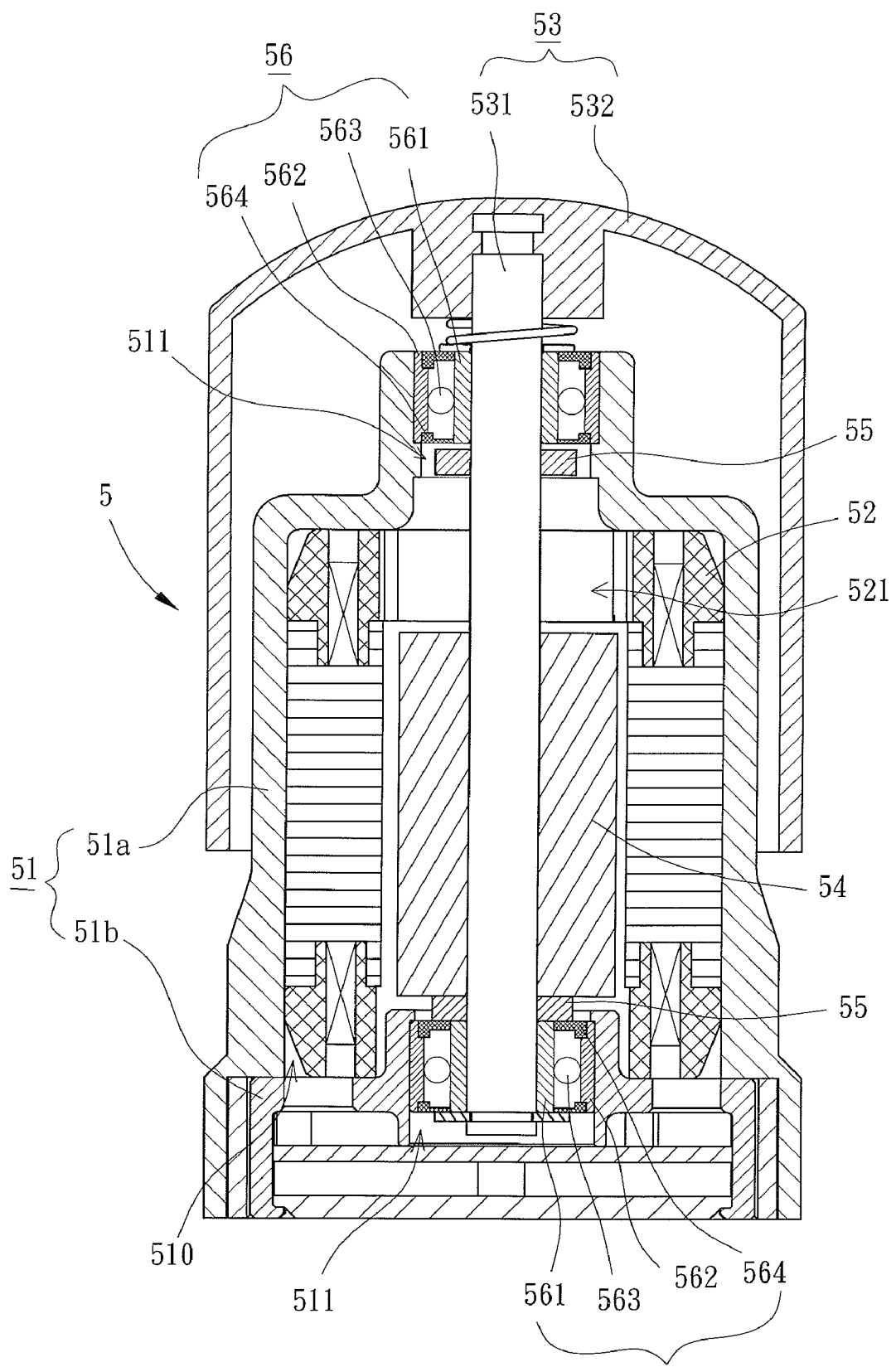
FIG. 4 is a cross sectional view illustrating the inner-rotor-type motor of FIG. 3.

Referring to FIGS. 3 and 4, the housing 51 is constructed by a shell 51a having a compartment 510, and a seat 51b mounted in the shell 51a. There are two axial through-holes 511 formed at an end of the shell 51a and in a central portion of the seat 51b respectively, with the axial through-holes 511 connecting with the compartment 510. Thus, the two axial through-holes 511 are at the top and bottom of the housing 51. The stator 52 is received in the compartment 510 of the housing 51, and there is an assembling hole 521 arranged at the axial center of the stator 52 and passing through the stator 52 from the top to the bottom thereof. The rotor 53 has a shaft 531 and a hub 532 fixed to one end of the shaft 531. The permanent magnet 54 is fixed to an outer periphery of the shaft 531. The two cover plates 55 are mounted around the shaft 531, with the permanent magnet 54 being between the cover plates 55. Furthermore, each cover plate 55 is selected from a washer or a metal ring, and preferably selected from a ring made of magnetically conductive material.

With the stator 52 being received in the compartment 510, the assembling hole 521 of the stator 52 aligns and connects with the two axial through-holes 511 of the housing 51. The other end of the shaft 531, without attaching to the hub 532, rotatably extends through the assembling hole 521 of the stator 52. The shaft 531 is rotatably positioned in the assembling hole 521 by two bearings 56 received in the axial through-holes 511 of the housing 51, with the permanent magnet 54 facing the stator 52 and arranged between the two bearings 56. Moreover, there is a gap formed between the permanent magnet 54 and the stator 52. In this embodiment, each of the bearings 56 is selected from a ball bearing consisting of an inner ring 561 fixing to the shaft 531, an outer ring 562 fixing to the housing 51, and a plurality of balls 563 sandwiched between the inner ring 561 and the outer ring 562. Two lateral covers 564 respectively couple with the inner and outer rings 561, 562 to form a compartment receiving the plurality of balls 563.

Figure 5:
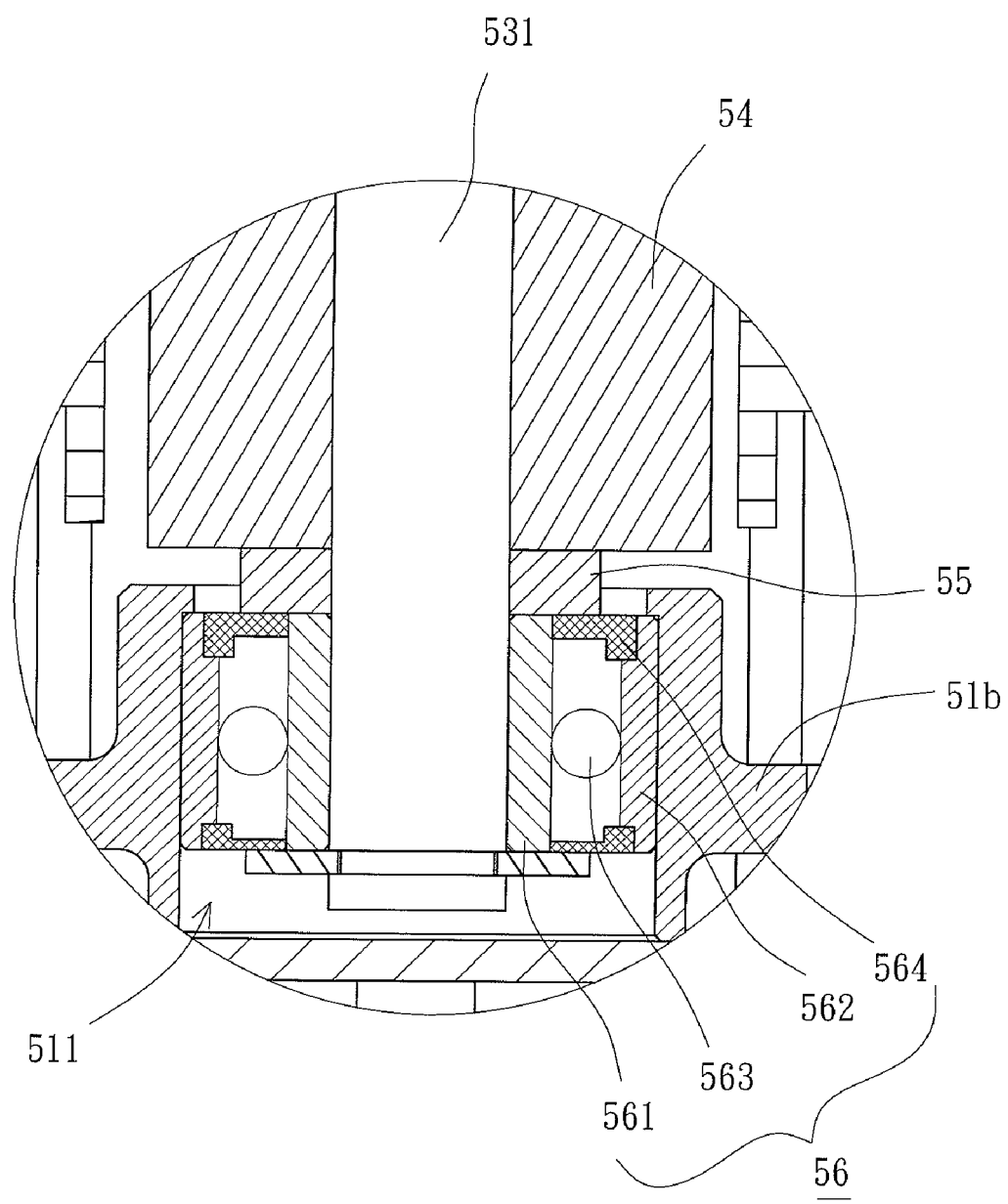
FIG. 5 is a partial, enlarged, cross sectional view of the inner-rotor-type motor of FIG. 4.

FIG. 5 shows a partial, enlarged, and cross sectional view of one of the two cover plate 55, which is the cover plate 55 close to the bearing 56 in the seat 51b of the housing 51. In addition to being mounted around the shaft 531, the cover plate 55 abuts on the top end-face of the bearing 56 and covers one end of an undesired interstice between the inner ring 561 of the bearing 56 and the shaft 531. Additionally, an outer diameter of the cover plate 55 is preferably larger than that of the inner ring 561, and in the embodiment shown, the cover plate 55 extends over a center point of the gap defined between the inner and outer rings 561, 562 of the bearing 56 radially of the shaft 531. By this arrangement, after a long-term operation of the inner-rotor-type motor 5, impurities like undesired powder parted from components of the inner-rotor-type motor 5, such as the permanent magnet 54, are prevented from entering and depositing in the undesired interstice between the inner ring 561 of the bearing 56 and the shaft 531 or from entering and depositing in the inside of the bearing 56 through the gaps between the inner ring 561 and the outer ring 562. Therefore, influence of impurities on rotation of the shaft 531 is avoided to assure smooth rotation of the shaft 531 and to extend life of the inner-rotor-type motor 5.

It is noted that numbers of the cover plates 55 and the bearings 56 are the same in this embodiment, and the cover plates 55 cover end faces of the inner rings 561 to keep impurities out of the undesired interstices between the inner rings 561 and the shaft 531 or out of the insides of the bearings 56. Alternatively, numbers of the cover plates 55 and the bearings 56 can be different according to the use of the inner-rotor-type motor 5. For example, while the inner-rotor-type motor 5 is standing with the shell 51a above the seat 51b, there can be only one cover plate 55 arranged between the permanent magnet 54 and the lower bearing 56 in the seat 51b. Furthermore, the single cover plate 55 can just be close to the end-face of the inner ring 561 of the bearing 56 and impurities entering the bearing 56 are still avoided to provide smooth rotation of the shaft 531. Hence, the number of the cover plate 55 and the position of the cover plate 55 relative to the bearing 56 are adjustable based on needs of use.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An inner-rotor-type motor comprising:
   a housing including a compartment;
   a stator received in the compartment, with an assembling hole arranged at an axial center of the stator and passing through the stator from a top to a bottom of the stator;
   a rotor including a shaft with one end thereof rotatably extending through the assembling hole of the stator, with at least one bearing being mounted around the shaft, wherein the at least one bearing is a ball bearing including an inner ring, an outer ring, two lateral covers respectively coupled with the inner and outer rings to form a compartment, and a plurality of balls sandwiched between the inner ring and the outer ring and received in the compartment, with a gap defined between the inner and outer ring;
   a permanent magnet fixed to an outer periphery of the shaft and beside the bearing, with the permanent magnet facing the stator; and
   at least one cover plate arranged between the permanent magnet and the at least one bearing, wherein the at least one cover plate extends over a center point of the gap defined between the inner and outer rings.

2. The inner-rotor-type motor as defined in claim 1, wherein the at least one cover plate is mounted around the shaft and abuts on an end-face of the inner ring of the at least one bearing.

3. The inner-rotor-type motor as defined in claim 1, wherein the at least one cover plate is mounted around the shaft and close to an end-face of the inner ring of the at least one bearing.

4. The inner-rotor-type motor as defined in claim 2, wherein an outer diameter of the at least one cover plate is larger than an outer diameter of the inner ring.

5. The inner-rotor-type motor as defined in claim 1, wherein numbers of the at least one cover plate and the at least one bearing are the same.

* * * * *